(12) United States Patent
Chen et al.

(10) Patent No.: US 10,783,884 B2
(45) Date of Patent: Sep. 22, 2020

(54) ELECTRONIC DEVICE-AWAKENING METHOD AND APPARATUS, DEVICE AND COMPUTER-READABLE STORAGE MEDIUM

(71) Applicant: BAIDU ONLINE NETWORK TECHNOLOGY (BEIJING) CO., LTD., Beijing (CN)

(72) Inventors: Rongjie Chen, Beijing (CN); Lifeng Zhao, Beijing (CN); Xiantang Chang, Beijing (CN); Shiwei Yan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 96 days.

(21) Appl. No.: 15/857,569

(22) Filed: Dec. 28, 2017

(65) Prior Publication Data
US 2019/0013020 A1    Jan. 10, 2019

(30) Foreign Application Priority Data

Jul. 5, 2017    (CN) .......................... 2017 1 0543516

(51) Int. Cl.
*G10L 15/22*    (2006.01)
*G06F 3/16*    (2006.01)
*G10L 13/04*    (2013.01)

(52) U.S. Cl.
CPC .............. *G10L 15/22* (2013.01); *G06F 3/167* (2013.01); *G10L 13/043* (2013.01); *G10L 2015/223* (2013.01); *G10L 2015/225* (2013.01)

(58) Field of Classification Search
CPC .......... G10L 13/02; G10L 15/20; G10L 15/22; G10L 17/005
See application file for complete search history.

(56) References Cited

U.S. PATENT DOCUMENTS 7,418,392 B1 *    8/2008    Mozer ..................... G10L 15/26
                                                            315/307
8,898,568 B2    11/2014    Bull et al.
(Continued)

FOREIGN PATENT DOCUMENTS

| CN | 1196536 A | 10/1998 |
|---|---|---|
| CN | 102150128 A | 8/2011 |

(Continued)

OTHER PUBLICATIONS

Extended European Search Report from EP app. No. 18163301.7, dated Oct. 2, 2018.
(Continued)

*Primary Examiner* — Brian L Albertalli
(74) *Attorney, Agent, or Firm* — Ladas & Parry, LLP

(57) ABSTRACT

The present disclosure provides an electronic device-awakening method and apparatus, a device and a computer-readable storage medium. In embodiments of the present disclosure, the user's speech wakeup instruction which is used to awaken the electronic device is obtained, and then an audio data file is selected from at least two audio data files according to the speech wakeup instruction, as a wakeup answer file of the electronic device, so that the wakeup answer file of the electronic device can be played. Since there are more than one selectable audio data files, many types of prompt tones can be provided, thereby achieving the purpose of providing many types of wakeup prompts.

6 Claims, 2 Drawing Sheets

(56) References Cited

U.S. PATENT DOCUMENTS

| | | | | |
|---|---|---|---|---|
| 9,691,378 B1* | 6/2017 | Meyers | | G10L 15/08 |
| 2015/0053779 A1* | 2/2015 | Adamek | | F24F 11/30 |
| | | | | 236/1 C |
| 2015/0134340 A1* | 5/2015 | Blaisch | | G06F 16/95 |
| | | | | 704/275 |
| 2015/0142438 A1* | 5/2015 | Dai | | G10L 17/22 |
| | | | | 704/246 |
| 2017/0221470 A1* | 8/2017 | Kayama | | G10L 25/90 |
| 2017/0330565 A1* | 11/2017 | Daley | | G10L 15/08 |
| 2018/0096681 A1* | 4/2018 | Ni | | G10L 15/063 |
| 2018/0211665 A1* | 7/2018 | Park | | G10L 15/22 |
| 2018/0301147 A1* | 10/2018 | Kim | | G10L 15/22 |
| 2018/0341643 A1* | 11/2018 | Alders | | G10L 13/033 |
| 2019/0108839 A1* | 4/2019 | Reilly | | G10L 15/02 |
| 2019/0130911 A1* | 5/2019 | Hanes | | G06F 3/167 |

FOREIGN PATENT DOCUMENTS

| | | |
|---|---|---|
| CN | 202068466 U | 12/2011 |
| JP | H10293709 A | 11/1998 |
| JP | 2001273065 A | 10/2001 |
| JP | 200496520 A | 3/2004 |
| JP | 2006106748 A | 4/2006 |
| WO | 2015060867 A1 | 4/2015 |
| WO | 2016063879 A1 | 4/2016 |
| WO | 2016085776 A1 | 6/2016 |
| WO | WO-2018188587 A1 * 10/2018 ............. G10L 15/22 |

OTHER PUBLICATIONS

Notification of Reasons for Refusal from JP app. No. 2018-047963, dated Jan. 8, 2019, with machine translation from Global Dossier.
Notification of Reason for Refusal from KR app. No. 10-2018-0030249, dated Jul. 5, 2019, with English translation from Global Dossier.
First Office Action and search report from CN app. No. 201710543516.4, dated Mar. 5, 2020, with English translation from Global Dossier.
Communication pursuant to Article 94(3) EPC from EP app. No. 18163301.7, dated Feb. 18, 2020.

* cited by examiner

ELECTRONIC DEVICE-AWAKENING METHOD AND APPARATUS, DEVICE AND COMPUTER-READABLE STORAGE MEDIUM

CROSS REFERENCE TO RELATED APPLICATION

The present application claims priority to Chinese Patent Application No. 2017105435164, filed on Jul. 5, 2017, with the title of "Electronic device-awakening method and apparatus, device and computer-readable storage medium", the disclosure of which is hereby incorporated herein by reference in its entirety.

FIELD OF THE DISCLOSURE

The present disclosure relates to wakeup technologies, and particularly to an electronic device-awakening method and apparatus, a device and a computer-readable storage medium.

BACKGROUND OF THE DISCLOSURE

Artificial intelligence, abbreviated as AI, is a new technological science which reaches and develops theories, methods, techniques and application systems for simulating, extending and expanding human intelligence. Artificial intelligence, as a branch of computer science, is intended to learn about essence of intelligence and creates a new intelligent machine which is capable of responding in a manner similar to human intelligence. Research in the field includes robots, language recognition, image recognition, natural language processing, expert systems and the like.

In recent years, electronic devices having a speech interaction function, for example, smart acoustic enclosures spring up constantly, and they are usually awakened in a speech wakeup manner. A known speech wakeup manner can only provide a single prompt tone as a wakeup prompt, and the wakeup form is singular.

SUMMARY OF THE DISCLOSURE

A plurality of aspects of the present disclosure provide an electronic device-awakening method and apparatus, a device and a computer-readable storage medium, to provide many types of wakeup prompts.

According to an aspect of the present disclosure, there is provided an electronic device-awakening method, comprising:

obtaining a user's speech wakeup instruction which is used to awaken the electronic device;

selecting an audio data file from at least two audio data files according to the speech wakeup instruction, as a wakeup answer file of the electronic device;

playing the wakeup answer file of the electronic device.

The above aspect and any possible implementation mode further provide an implementation mode: before the selecting an audio data file from at least two audio data files according to the speech wakeup instruction, as the wakeup answer file of the electronic device, the method further comprises:

obtaining at least one prompt text and at least one sound parameter;

generating said at least two audio data files by using TTS technology according to said at least one prompt text and said at least one sound parameter.

The above aspect and any possible implementation mode further provide an implementation mode: after generating said at least two audio data files by using TTS technology according to said at least one prompt text and said at least one sound parameter, the method further comprises:

providing said at least two audio data files to the electronic device so that the electronic device performs storage processing.

The above aspect and any possible implementation mode further provide an implementation mode: the selecting the audio data file from at least two audio data files according to the speech wakeup instruction, as the wakeup answer file of the electronic device comprises:

randomly selecting an audio data file from the at least two audio data files according to the speech wakeup instruction, as the wakeup answer file of the electronic device.

The above aspect and any possible implementation mode further provide an implementation mode: the selecting the audio data file from at least two audio data files according to the speech wakeup instruction, as the wakeup answer file of the electronic device comprises:

obtaining a voice print feature according to the speech wakeup instruction;

selecting one user-set audio data file from the at least two audio data files according to the voice print feature, as the wakeup answer file of the electronic device.

According to another aspect of the present disclosure, there is provided an electronic device-awakening apparatus, comprising:

an obtaining unit configured to obtain a user's speech wakeup instruction which is used to awaken the electronic device;

a selecting unit configured to select an audio data file from at least two audio data files according to the speech wakeup instruction, as a wakeup answer file of the electronic device;

a playing unit configured to play the wakeup answer file of the electronic device.

The above aspect and any possible implementation mode further provide an implementation mode: the electronic device-awakening apparatus further comprises a generating unit configured to obtain at least one prompt text and at least one sound parameter;

generate said at least two audio data files by using TTS technology according to said at least one prompt text and said at least one sound parameter.

The above aspect and any possible implementation mode further provide an implementation mode: the generating unit is further configured to provide said at least two audio data files to the electronic device so that the electronic device performs storage processing.

The above aspect and any possible implementation mode further provide an implementation mode: the selecting unit is specifically configured to randomly select an audio data file from the at least two audio data files according to the speech wakeup instruction, as the wakeup answer file of the electronic device.

The above aspect and any possible implementation mode further provide an implementation mode: the selecting unit is specifically configured to obtain a voice print feature according to the speech wakeup instruction;

select one user-set audio data file from the at least two audio data files according to the voice print feature, as the wakeup answer file of the electronic device.

According to a further aspect of the present disclosure, there is provided an device, comprising
one or more processors;
a storage device for storing one or more programs;
the one or more programs, when being executed by the one or more processors, enable the one or more processors to implement the electronic device-awakening method as stated in the first aspect.

According to a further aspect of the present disclosure, there is provided a computer-readable storage medium on which a computer program is stored, the program, when executed by a processor, implementing the electronic device-awakening method as stated in the first aspect.

As known from the above technical solutions, in the embodiments of the present disclosure, the user's speech wakeup instruction which is used to awaken the electronic device is obtained, and then an audio data file is selected from at least two audio data files according to the speech wakeup instruction, as a wakeup answer file of the electronic device, so that the wakeup answer file of the electronic device can be played. Since there are more than one selectable audio data files, many types of prompt tones can be provided, thereby achieving the purpose of providing many types of wakeup prompts.

In addition, the technical solutions according to the present disclosure can be employed to accurately recognize which user is awakening the electronic device by using the voice print feature, and thereby select one user-set audio data file as the wakeup answer file of the electronic device so that personalized prompt tones can be provided to the user, and the purpose of providing many types of wakeup prompts is further implemented.

In addition, the technical solutions according to the present disclosure can be employed to effectively improve the user's experience.

BRIEF DESCRIPTION OF DRAWINGS

To describe technical solutions of embodiments of the present disclosure more clearly, figures to be used in the embodiments or in depictions regarding the prior art will be described briefly. Obviously, the figures described below are only some embodiments of the present disclosure. Those having ordinary skill in the art appreciate that other figures may be obtained from these figures without making inventive efforts.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments obtained by those having ordinary skill in the art based on the embodiments of the present disclosure, without making any inventive efforts, fall within the protection scope of the present disclosure.

It needs to be appreciated that the terminals involved in the embodiments of the present disclosure comprise but are not limited to a mobile phone, a Personal Digital Assistant (PDA), a wireless handheld device, a tablet computer, a Personal Computer (PC), an MP3 player, an MP4 player, and a wearable device (e.g., a pair of smart glasses, a smart watch, or a smart bracelet).

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
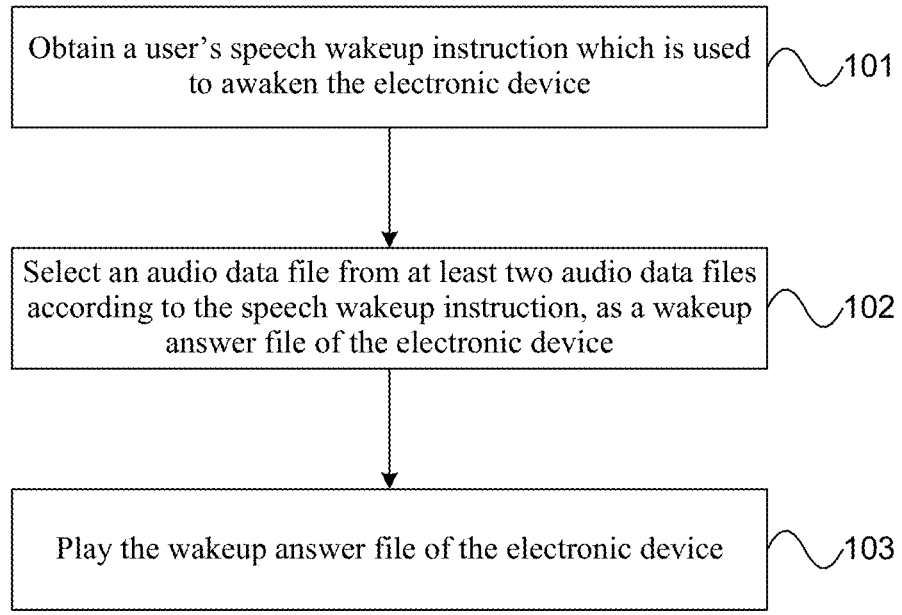
FIG. 1 is a flow chart of an electronic device-awakening method according to an embodiment of the present disclosure.

FIG. 1 is a flow chart of an electronic device-awakening method according to an embodiment of the present disclosure. As shown in FIG. 1,

101: obtaining a user's speech wakeup instruction which is used to awaken the electronic device.

102: selecting an audio data file from at least two audio data files according to the speech wakeup instruction, as a wakeup answer file of the electronic device.

103: playing the wakeup answer file of the electronic device.

It may be appreciated that after obtaining the user's speech wakeup instruction in 101, the electronic device may employ a technical solution in the prior art to perform a relevant wakeup operation according to the speech wakeup instruction to enter a working state. Reference may be made to relevant content in the prior art for details.

It needs to be appreciated that subjects for executing 101-103 may partially or totally be an application located in the electronic device, or an application located in a local terminal, or a function unit such as a plug-in or Software Development Kit (SDK) arranged in an application of the local terminal, or a processing engine located in a network-side server, or a distributed type system located on the network side. This is not particularly limited in the present embodiment.

It may be understood that the application may be a native application (nativeAPP) installed on the terminal, or a web program (webApp) of a browser on the terminal. This is not particularly limited in the present embodiment.

As such, the user's speech wakeup instruction which is used to awaken the electronic device is obtained, and then an audio data file is selected from at least two audio data files according to the speech wakeup instruction, as a wakeup answer file of the electronic device, so that the wakeup answer file of the electronic device can be played. Since there are more than one selectable audio data file, many types of prompt tones can be provided, thereby achieving the purpose of providing many types of wakeup prompts.

Currently, household electronic devices having operating systems, such as computers, smart household devices and TV set-top boxes, all have a system sleep function; when a certain condition is reached, the system will enter a sleep state, for example, the electronic device may close some functions of the electronic device and only retain partial functions such as wakeup function and power supply. As such, power consumption of the electronic device can be saved, and meanwhile loss of the electronic device can be reduced, and the service life of the electronic device can be prolonged.

Optionally, in a possible implementation mode of the present embodiment, before 101, the electronic device has already been in a sleep state.

Optionally, in a possible implementation mode of the present embodiment, before 101, it is possible to further set some specific speech instructions as speech wakeup instructions, for example, "Hi, let's go ahead".

Optionally, in a possible implementation mode of the present embodiment, in 101, it is specifically possible to use a sound acquiring device to acquire the speech wakeup instruction provided by the user, wherein the sound acquiring device may be a microphone built in or out of the electronic device. This is not particularly limited in the present embodiment.

Optionally, in a possible implementation mode of the present embodiment, before 102, it is feasible to further obtain at least one prompt text and at least one sound parameter, and thereby generate said at least two audio data files by using Text to Speech TTS technology according to said at least one prompt text and said at least one sound parameter.

Wherein the sound parameter may include but is not limited to at least one of pitch parameter, tone parameter, volume parameter, timbre parameter, sound speed parameter and sound effect parameter. This is not particularly limited in the present embodiment.

The so-called sound parameter may refer to relevant parameters for determining sound roles, e.g., male speech, female speech, kid speech, cartoon character's speech. This is not particularly limited in the present embodiment.

Specifically, in the implementation mode, it is feasible to generate said at least two audio data files in a local manner, or generate said at least two audio data files in a cloud manner. This is not particularly limited in the present embodiment.

Furthermore, it is further feasible to, after generating said at least two audio data files, further provide said at least two audio data files to the electronic device so that the electronic device performs storage processing.

For example, after the electronic device generates said at least two audio data files, it is feasible to respectively store the generated at least two audio data files under corresponding catalogs of the electronic device according to the sound roles.

Or, for another example, the user may use an application on the terminal corresponding to the smart device to provide sound parameters according to his own inclinations to control to generate said at least two audio data files. For example, the user uses application on the terminal corresponding to the smart device to send the sound parameters to the electronic device which generates said at least two audio data files. Or, again for example, the user uses an application on the terminal corresponding to the smart device or a server corresponding to the application to generate said at least two audio data files. Then, the generated at least two audio data files may be respectively stored under corresponding catalogs of the electronic device according to the sound roles.

Optionally, in a possible implementation mode of the present embodiment, in 102, it is specifically feasible to randomly select an audio data file from the at least two audio data files according to the speech wakeup instruction, as the wakeup answer file of the electronic device.

Optionally, in a possible implementation mode of the present embodiment, in 102, it is specifically possible to obtain a voice print feature according to the speech wakeup instruction, and then select one user-set audio data file from the at least two audio data files according to the voice print feature, as the wakeup answer file of the electronic device.

The so-called voice print feature is an audio data-specific feature and refers to a content-based digital signature that may represent important acoustic features of a section of audio data, and its main purpose is to build an effective mechanism to compare perceptual hearing quality of two audio data. It is noted that comparison here is not directly comparing audio data themselves that are usually very large, but comparing their respective voice print features that are usually smaller.

In a specific implementation procedure, the voice print feature may include but is not limited to acoustic features related to anatomical structures of human pronunciation mechanisms, for example, spectrum, cepstrum, resonance peak, fundamental tones, reflection coefficient and the like.

Specifically, it is possible to sample, quantize and encode the user's speech wakeup instruction to obtain PCM data as the user's audio data. Then, it is feasible to perform framing processing for the user's audio data to obtain at least one frame of data, and then perform audio analysis processing for each frame of data in the at least one frame of data to obtain the voice print feature of each frame of data.

For example, it is feasible to perform framing processing for the user's audio data according to a preset time interval, e.g., 20 ms, with partial data overlapping between neighboring frames, for example, 50% data overlapping, so that at least one frame of data of the user's audio data can be obtained.

In another specific implementation procedure, before 102, it is possible to obtain the user's standard voice print, for example, collect user-provided reference speech instruction and obtain the user's standard voice print according to the reference speech instruction.

After the user's standard voice print is obtained, storage processing may be performed for it. Specifically, it is feasible to store the user's standard voice print on a storage device of a terminal, or on a storage device of the electronic device. This is not particularly limited in the present embodiment.

In a specific implementation procedure, the storage device may be a low-speed storage device, and may specifically be a hard disk of a computer system, or a non-running memory of the terminal or electronic device, namely, a physical memory such as a Read-Only Memory (ROM) or memory card. This is not particularly limited in the present embodiment.

In another specific implementation procedure, the storage device may be a high-speed storage device, and may specifically be a memory of a computer system, or a running memory of the terminal or electronic device, namely, a system memory such as a Random Access Memory (RAM). This is not particularly limited in the present embodiment.

In this embodiment, the user's speech wakeup instruction which is used to awaken the electronic device is obtained, and then an audio data file is selected from at least two audio data files according to the speech wakeup instruction, as a wakeup answer file of the electronic device, so that the wakeup answer file of the electronic device can be played. Since there are more than one selectable audio data files, many types of prompt tones can be provided, thereby achieving the purpose of providing many types of wakeup prompts.

In addition, the technical solution according to the present disclosure can be employed to accurately recognize which user is awakening the electronic device by using the voice print feature, and thereby select one user-set audio data file as the wakeup answer file of the electronic device so that personalized prompt tones can be provided to the user, and the purpose of providing many types of wakeup prompts is further implemented.

In addition, the technical solution according to the present disclosure can be employed to effectively improve the user's experience.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

Figure 2:
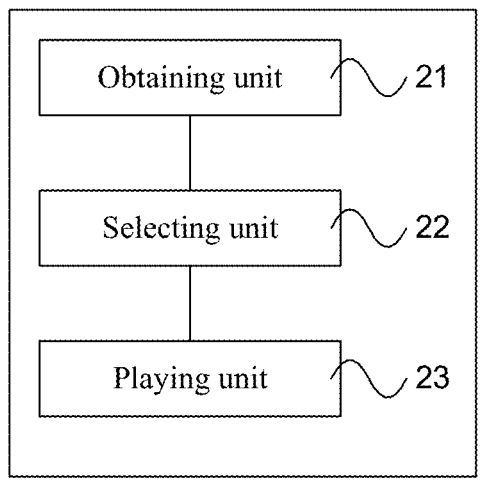
FIG. 2 is a block diagram of an electronic device-awakening apparatus according to another embodiment of the present disclosure.

FIG. 2 is a block diagram of an electronic device-awakening apparatus according to another embodiment of the present disclosure. As shown in FIG. 2, the electronic device-awakening apparatus according to the present embodiment may include an obtaining unit 21, a selecting unit 22 and a playing unit 23, wherein the obtaining unit 21 is configured to obtain a user's speech wakeup instruction which is used to awaken the electronic device; the selecting unit 22 is configured to select an audio data file from at least two audio data files according to the speech wakeup instruction, as a wakeup answer file of the electronic device; the playing unit 23 is configured to play the wakeup answer file of the electronic device.

It needs to be appreciated that electronic device-awakening device according to the embodiment may partially or totally be an application located in a local terminal, namely, or a function unit such as a plug-in or Software Development Kit (SDK) located in an application of the local terminal, or a query engine located in a network-side server, or a distributed type system located on the network side. This is not particularly limited in the present embodiment.

It may be understood that the application may be a native application (nativeAPP) installed on the terminal, or a web program (webApp) of a browser on the terminal. This is not particularly limited in the present embodiment.

Figure 3:
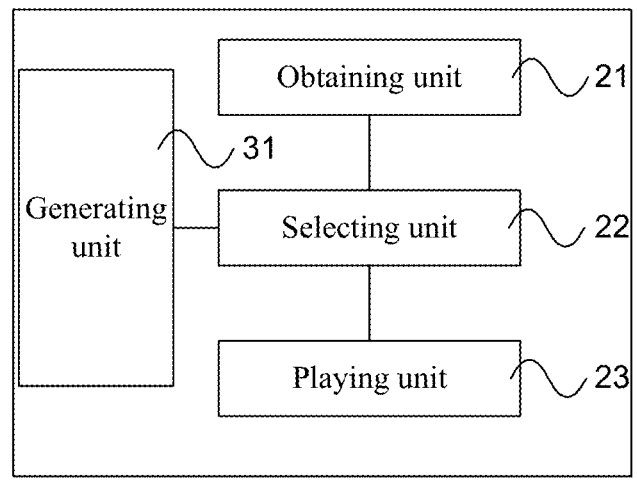
FIG. 3 is a block diagram of an electronic device-awakening apparatus according to a further embodiment of the present disclosure.

Optionally, in a possible implementation mode of the present embodiment, as shown in FIG. 3, the electronic device-awakening apparatus according to the present embodiment may further comprise a generating unit 31 configured to obtain at least one prompt text and at least one sound parameter, and generate said at least two audio data files by using TTS technology according to said at least one prompt text and said at least one sound parameter.

Furthermore, in the implementation mode, the generating unit 31 may further be configured to provide said at least two audio data files to the electronic device so that the electronic device performs storage processing.

Optionally, in a possible implementation mode of the present embodiment, the selecting unit 22 is specifically configured to randomly select an audio data file from the at least two audio data files according to the speech wakeup instruction, as the wakeup answer file of the electronic device.

Optionally, in a possible implementation mode of the present embodiment, the selecting unit 22 is specifically configured to obtain a voice print feature according to the speech wakeup instruction, and then select one user-set audio data file from the at least two audio data files according to the voice print feature, as the wakeup answer file of the electronic device.

It needs to be appreciated that the method in the embodiment corresponding to FIG. 1 may be implemented by the electronic device-awakening apparatus according to the present embodiment. Reference may be made to relevant contents in the embodiment corresponding to FIG. 1 for detailed description, which will not be detailed any longer here.

In the present embodiment, the obtaining unit obtains the user's speech wakeup instruction which is used to awaken the electronic device, and then the selecting unit selects an audio data file from at least two audio data files according to the speech wakeup instruction, as a wakeup answer file of the electronic device, so that the playing unit can play the wakeup answer file of the electronic device. Since there are more than one selectable audio data files, many types of prompt tones can be provided, thereby achieving the purpose of providing many types of wakeup prompts.

In addition, the technical solution according to the present disclosure can be employed to accurately recognize which user is awakening the electronic device by using the voice print feature, and thereby select one user-set audio data file as the wakeup answer file of the electronic device so that personalized prompt tones can be provided to the user, and the purpose of providing many types of wakeup prompts is further implemented.

In addition, the technical solution according to the present disclosure can be employed to effectively improve the user's experience.

Figure 4:
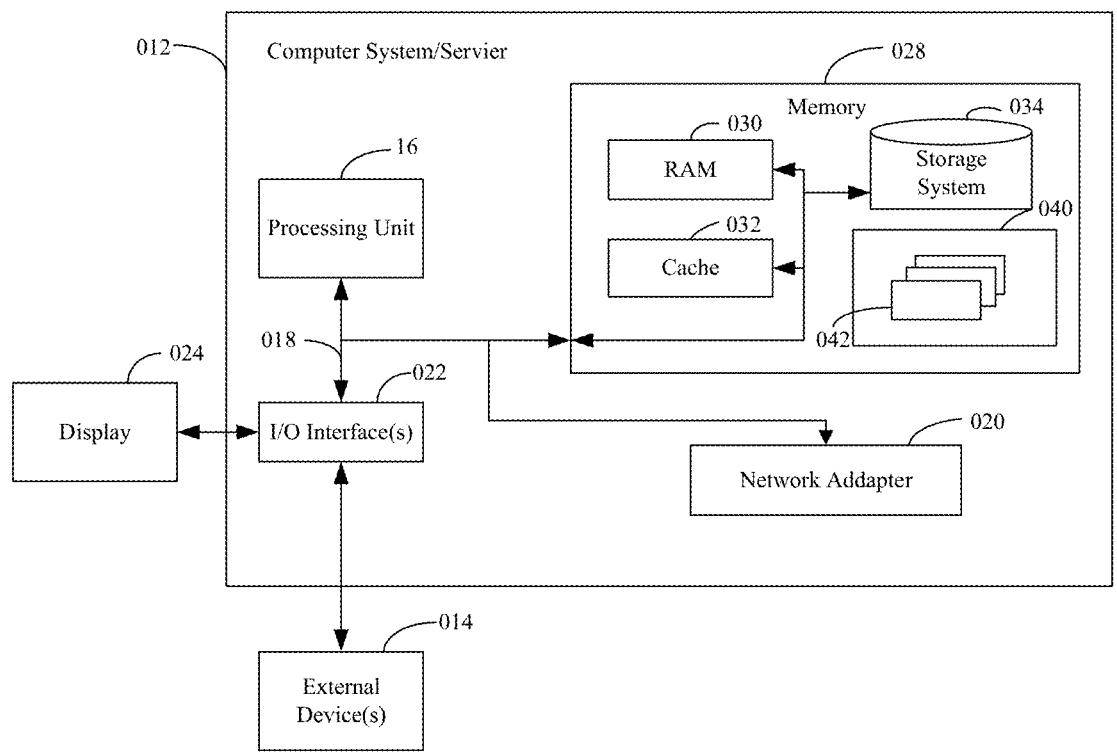
FIG. 4 is a block diagram of an exemplary computer system/server 12 adapted to implement the embodiment of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the electronic device-awakening method provided by the embodiment corresponding to FIG. 1.

Another embodiment of the present disclosure further provides a computer-readable storage medium on which a computer program is stored. The program, when executed by a processor, can implement the electronic device-awakening method provided by the embodiment corresponding to FIG. 1.

Specifically, the computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art can clearly understand that for purpose of convenience and brevity of depictions, reference may be made to corresponding procedures in the aforesaid method embodiments for specific operation procedures of the apparatus and units described above, which will not be detailed any more.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communicative connection as displayed or discussed may be indirect coupling or communicative connection performed via some interfaces, means or units and may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, read-only memory (ROM), a random access memory (RAM), magnetic disk, or an optical disk.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. An electronic device-awakening method, wherein the method comprises:
    obtaining a user's speech wakeup instruction which is used to awaken the electronic device;
    selecting an audio data file from at least two audio data files according to the speech wakeup instruction, as a wakeup answer file of the electronic device;
    playing the wakeup answer file of the electronic device;
    wherein before selecting an audio data file from at least two audio data files according to the speech wakeup instruction, as the wakeup answer file of the electronic device, the method further comprises:
    obtaining at least one prompt text and at least two sound parameters;
    generating said at least two audio data files by using TTS technology according to said at least one prompt text and said at least two sound parameters; and wherein said at least two sound parameters comprises parameters for determining sound roles including at least two of male speech, female speech, kid speech and cartoon character's speech, and said at least two audio data files are of different sound roles; and
    wherein the selecting the audio data file from at least two audio data files according to the speech wakeup instruction, as the wakeup answer file of the electronic device comprises:
    obtaining a voice print feature according to the speech wakeup instruction;
    selecting one user-set audio data file from the at least two audio data files according to the voice print feature, as the wakeup answer file of the electronic device.

2. The method according to claim 1, wherein after generating said at least two audio data files by using TTS technology according to said at least one prompt text and said at least one sound parameter, the method further comprises:
    providing said at least two audio data files to the electronic device so that the electronic device performs storage processing.

3. A device, wherein the device comprises:
    one or more processors;
    a memory storing instructions, which when executed by the at least one processor, cause the at least one processor to perform operation, the operation comprising:
    obtaining a user's speech wakeup instruction which is used to awaken the electronic device;
    selecting an audio data file from at least two audio data files according to the speech wakeup instruction, as a wakeup answer file of the electronic device;
    playing the wakeup answer file of the electronic device;
    wherein before selecting an audio data file from at least two audio data files according to the speech wakeup instruction, as the wakeup answer file of the electronic device, the method further comprises:
    obtaining at least one prompt text and at least two sound parameters;
    generating said at least two audio data files by using TTS technology according to said at least one prompt text and said at least two sound parameters; and wherein said at least two sound parameters comprises parameters for determining sound roles including at least two of male speech, female speech, kid speech and cartoon character's speech, and said at least two audio data files are of different sound roles; and
    wherein the selecting the audio data file from at least two audio data files according to the speech wakeup instruction, as the wakeup answer file of the electronic device comprises:
    obtaining a voice print feature according to the speech wakeup instruction;
    selecting one user-set audio data file from the at least two audio data files according to the voice print feature, as the wakeup answer file of the electronic device.

4. A non-transitory computer-readable storage medium, wherein the computer storage medium is coded with a computer program, and when the program is executed by one or more computers, the one or more computers perform the following operation:
    obtaining a user's speech wakeup instruction which is used to awaken the electronic device;
    selecting an audio data file from at least two audio data files according to the speech wakeup instruction, as a wakeup answer file of the electronic device;
    playing the wakeup answer file of the electronic device;
    wherein before selecting an audio data file from at least two audio data files according to the speech wakeup instruction, as the wakeup answer file of the electronic device, the method further comprises:
    obtaining at least one prompt text and at least two sound parameters;
    generating said at least two audio data files by using TTS technology according to said at least one prompt text and said at least two sound parameters; and wherein said at least two sound parameters comprises parameters for determining sound roles including at least two of male speech, female speech, kid speech and cartoon character's speech, and said at least two audio data files are of different sound roles; and wherein the selecting the audio data file from at least two audio data files according to the speech wakeup instruction, as the wakeup answer file of the electronic device comprises:

obtaining a voice print feature according to the speech wakeup instruction;

selecting one user-set audio data file from the at least two audio data files according to the voice print feature, as the wakeup answer file of the electronic device.

5. The device according to claim 3, wherein after generating said at least two audio data files by using TTS technology according to said at least one prompt text and said at least one sound parameter, the operation further comprises:

providing said at least two audio data files to the electronic device so that the electronic device performs storage processing.

6. The non-transitory computer-readable storage medium according to claim 4, wherein after generating said at least two audio data files by using TTS technology according to said at least one prompt text and said at least one sound parameter, the operation further comprises:

providing said at least two audio data files to the electronic device so that the electronic device performs storage processing.

* * * * *